United States Patent [19]

Van Leijenhorst et al.

[11] Patent Number: 4,785,942
[45] Date of Patent: Nov. 22, 1988

[54] SWITCH PROVIDED WITH ONE OR MORE VANES AND USED FOR A SORTING DEVICE

[75] Inventors: Harro M. Van Leijenhorst, Zoetermeer; Geert J. Prins, Delft; Joseph E. H. Smeets, The Hague; Jan F. Suringh, Rotterdam, all of Netherlands

[73] Assignee: Staat Der Nederlanden (Staats dedrijf Der Posterijen, Telegraphie en Telefonie), The Hague, Netherlands

[21] Appl. No.: 852,355

[22] Filed: Apr. 15, 1986

[30] Foreign Application Priority Data

Apr. 18, 1985 [NL] Netherlands .................. 8501131

[51] Int. Cl.⁴ .............................................. B07C 3/00
[52] U.S. Cl. ................................. 209/657; 74/96; 74/569; 198/367; 209/900; 271/303
[58] Field of Search ............ 209/656, 657, 900, 655; 198/367 X, 442; 271/303 X, 297; 74/96 X, 567, 569 X

[56] References Cited

U.S. PATENT DOCUMENTS

| 3,027,830 | 4/1962 | Yaeger ................... 209/900 |
| 4,251,000 | 2/1981 | Templeton .............. 209/657 |
| 4,288,069 | 9/1981 | Wallace et al. ......... 209/303 |
| 4,301,696 | 11/1981 | Andersson ............. 74/569 |
| 4,456,238 | 6/1984 | Mizuma .................. 271/303 |
| 4,499,834 | 2/1985 | Ruetschle et al. ..... 209/656 |

FOREIGN PATENT DOCUMENTS

| 3150328 | 6/1983 | Fed. Rep. of Germany . |
| 2068856 | 9/1971 | France . |
| 59702 | 2/1947 | Netherlands ........ 271/303 |
| 0043155 | 1/1982 | Netherlands . |
| 270508 | 3/1968 | U.S.S.R. .............. 271/303 |
| 700674 | 12/1953 | United Kingdom . |

Primary Examiner—Robert B. Reeves
Assistant Examiner—Donald T. Hajec
Attorney, Agent, or Firm—Frishauf, Holtz, Goodman & Woodward

[57] ABSTRACT

Switch, forming part of a mail sorting device and comprising, according to the invention, one or two rotatable or translatable switch vanes (7), which are driven, by way of one or more curve followers (6, 22) and one or more curve discs (8, 23), by one electromechanical converter, e.g. a tachometrically controlled direct-current servomotor (12). In this case the transmission ratios have been chosen in such a way that the external (virtual) mass moment of inertia is about equal to the internal mass moment of inertia of the motor. The invention can also be utilized for other quickly intermittent drives.

10 Claims, 3 Drawing Sheets

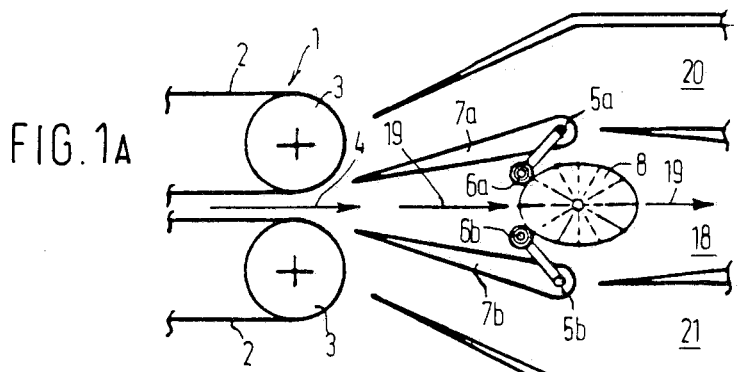
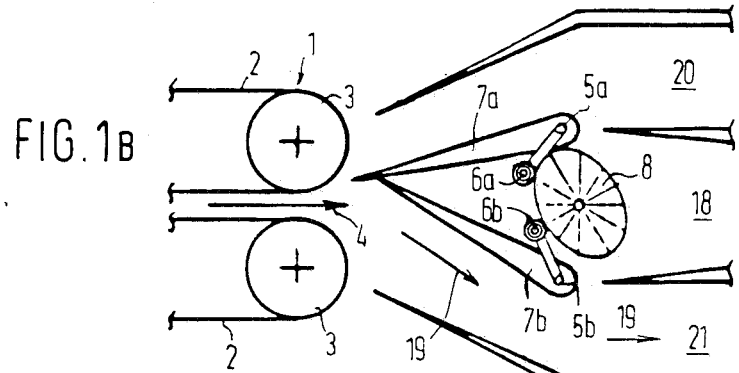
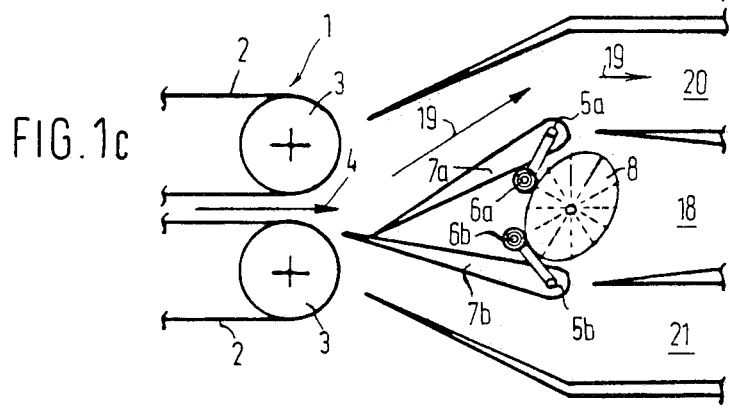
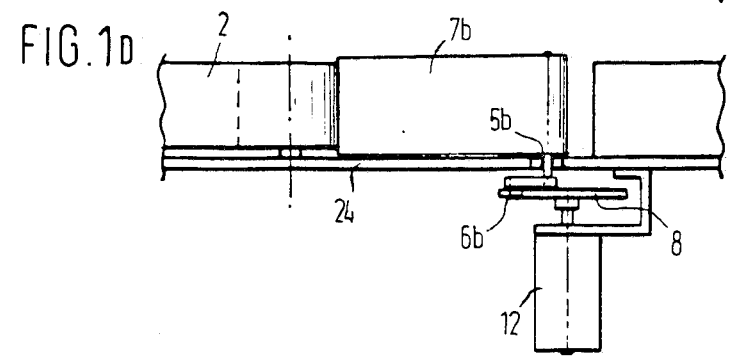

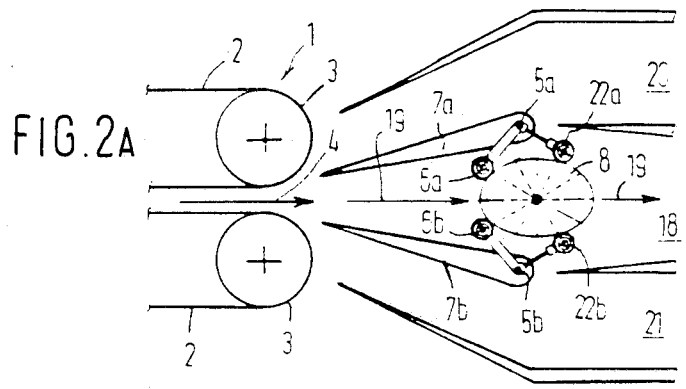
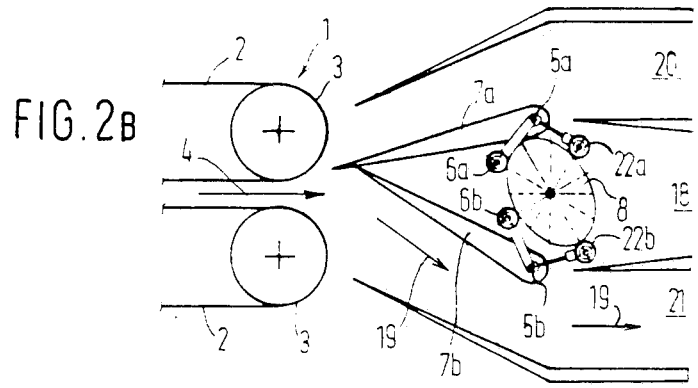
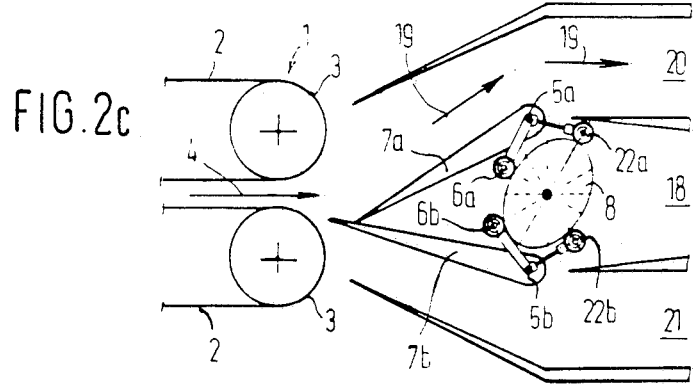
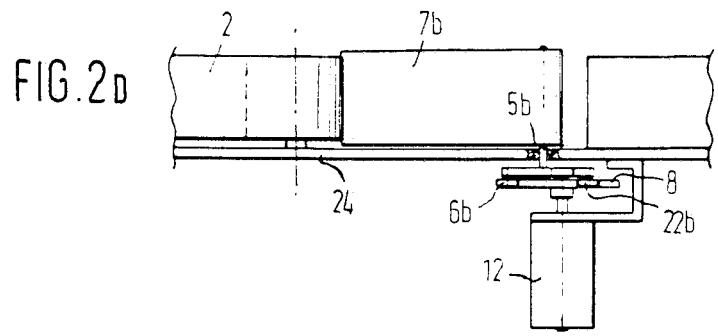

SWITCH PROVIDED WITH ONE OR MORE VANES AND USED FOR A SORTING DEVICE

BACKGROUND OF THE INVENTION

1. Field of the Invention

The invention relates to a switch for a sorting device, which switch comprises at least one vane for directing the flow of items to be sorted in the desired direction, which vane is movable by means of a driving device in a direction transversely to the flow of items to be sorted.

2. State of the Art

A switch of the aforesaid type is known from the U.S. Pat. No. 3,027,830. This specification discloses a switch of the above-mentioned sort, which forms part of a sorting device for postal articles, such as letters and the like. In this sorting device the postal articles to be sorted are led from an inlet store along a recognition system, where certain characteristics of the postal articles led along are scanned and processed, after which the postal articles are supplied to a switch, which consists of a pair of vanes, rotatable around two parallel shafts, and each capable of taking up two discrete rotational positions, due to which this known switch has three outlets. Each of these outlets opens into into an outlet store. In this case the positions of the switch vanes are controlled from the system in which the scanned characteristics of the postal articles are processed. The control of the positions of each of the vanes takes place by means of a pair of coils provided with a sliding core, one end of each of these sliding cores being pivotally mounted on one of the ends of a bridge portion, which is rigidly connected to the relevant vane and can rotate around the same shaft as the vane.

The advantage obtained when using a double-vane switch instead of e.g. a single-vane switch is that with a double-vane switch one or both switch vanes need not undergo more than one change of position for any change into another outlet position (so from outlet 1 to 2, 1 to 3, 2 to 1, 2 to 3, 3 to 1 or from 3 to 2). So it will not at all be necessary to take up an intermediate position, which is the case with a single-vane switch with three outlets (e.g. the change from outlet 1 into outlet 3 takes place via outlet 2).

A drawback of the known switch is that two coil-sliding core-combinations will be needed for operating each of the vanes. Apart from the fact that this is a comparatively expensive solution, which occupies relatively much room, the change-over speed is comparatively low, inter alia because of the relatively considerable mass of the two sliding cores. Moreover, the position of each of the vanes depends on the tensile force of the relevant coil, due to which the positions of the vanes are relatively sensitive to disturbances. Besides an electric current has constantly to flow through one of the coils in any position of each of the vanes, which is also a drawback in view of the cost of energy and the heat dissipation.

SUMMARY OF THE INVENTION

The object of the invention is to overcome the drawbacks of the known switch, and for that purpose it provides a switch of the sort mentioned in the preamble, characterized in that the vane, respectively each of the vanes, is driven by means of at least one curve or cam disc, which, in its turn, is driven by a converter converting electric energy into mechanical energy.

According to a preferred embodiment of the invention the curve or cam disc has a closed shape and is driven by an electromotor.

According to a further elaboration of said preferred embodiment the curve or cam disc is driven by a tachometrically controlled direct-current servomotor, the position of the shaft of which is controlled from a control device which forms part of the sorting device.

As it has appeared that the starting velocity of a servomotor will be the highest if the internal mass moment of inertia (so of the rotor) is equal to the external mass moment of inertia (so of the driven system), the aforesaid preferred embodiment is characterized in that the transmission ratio between the drive motor and the vane driven via the curve or cam disc has such a value that the external (virtual) mass moment of inertia is about equal to the internal mass moment of inertia of the drive motor.

The switch according to the present invention preferably comprises two vanes, which are driven by the same converter converting electric energy into mechanical energy.

According to a further elaboration of said preferred embodiment each of the vanes is provided with a curve or cam follower, adjacent to and in contact with the curve or cam disc, due to which the transversal variation of the curve or cam disc is converted into a rotating or translating movement of each of the vanes, in accordance with the shape of the curve or cam disc.

The shape of the cam disc mentioned in the preceding paragraph will preferably be such that, with the same angular rotation of this cam disc, the different combinations of discrete rotational positions of each of the vanes that are of importance for the functioning as a switch with three outlets will always be taken up by the vanes. It is thereby achieved that the change-over time of the switch will always be the same, and, consequently, optimum with any change of position.

In order to come to a very good assurance that the correct position of each of the vanes will always be obtained and maintained, it is preferred to provide each of the vanes, moreover, with a second cam follower, which is adjacent to and in contact with cam disc which is also driven by the electromotor or other converter converting electric energy into mechanical energy.

The first and the second curve or cam follower of each of the vanes are preferably adjacent to the same curve or cam disc, be it at different places. However, it will also be possible that the second curve or cam follower of each of the vanes is adjacent to a second curve or cam disc.

When the positions of each of the vanes for the three possible outlet positions are considered, it will appear that in one of the three outlet positions (see e.g. FIG. 3A) both vanes are in a relatively outward position, and that in the remaining two outlet rotational positions (see e.g. FIGS. 3B and 3C) one of the two vanes is in a relatively outward rotational position. If within a certain angle of rotation the various outlet positions have consecutively to be reached, the shape of the cam disc will, when turned in the same direction, have to be such that within that certain angle of rotation each of the cam followers and, consequently, each of the vanes will consecutively take up two relatively outward rotational positions, followed by one relatively inward rotational position. It is further desirable that the various vane rotational positions will be taken up with an equal angular rotation, or with an angular rotation which is one third of the aforesaid angle of rotation within which it must be feasible to reach each of the three possible outlet positions. With a view to the lowest possible wear and tear it is, finally, desirable that the transitions between the various rotational positions will take place as smoothly as possible. A cam disc of which the distance between its outside and its centre of rotation as a function of its angle of rotation corresponds to a great extent with the mathematical representation $r = A + B \cos(qf)$ well meets the aforeset criteria. In this mathematical representation r is the said (radial) distance between the center of rotation of the cam disc and a point on the outside of the disc in contact with a cam follower, A is a constant, equal to the average value of r, B is a constant representing the amplitude of the radial distance variation and, consequently, a measure for the amplitude of movement of the cam followers and of the vanes, q is equal to $(2\pi/\phi)$, in which $\phi$ is the aforesaid angle of rotation, within which it must be possible to reach each of the outlet positions of the switch, and f represents the angular rotation of the cam disc.

In order to equalize the speeds occurring as much as possible, it will be favourable to add odd higher harmonics to the variation of r as a function of f, due to which the mathematical representation of the cam disc which is preferably utilizable will be:

$$r(f) = A + B \cos(qf) + C \cos(3qf) + D \cos(5qf) + \ldots N \cos(nqf)$$

in which C, D and N indicate the degree of influence of the respective higher harmonics, A is a constant corresponding with the average value of r(f) and B is a constant representing the amplitude of the variation of the radius r(f). For the rest it is remarked that the constants B, C and D can be positive or negative.

The movement of the second cam follower is, as mentioned already before, derived from the movement of the first cam follower and is an inverted replica of the same. If the second cam follower follows the same cam disc as the first cam follower and the shape of the cam disc corresponds with one of the mathematical representations given before, the second cam follower of each of the vanes will have to follow the cam disc in a position of which the angle $\alpha$ between the connecting line of the point of contact with the second cam follower with the center of rotation of the cam disc and the connecting line of the point of contact with the cam disc of the first cam follower with the same center of rotation is equal to $(\pi/q)$, so that $\alpha$ equals $(\phi/2)$.

SHORT DESCRIPTION OF THE FIGURES

The invention will be further explained hereinafter with the help of some figures.

FIG. 1A shows in schematic horizontal cross-section view of a switch according to the invention which comprises two vanes, each with one cam roller, in a first discrete position for directing items to a middle outlet 18;

FIG. 1B shows the switch of FIG. 1A in a second discrete position for directing items to a right-hand outlet 21;

FIG. 1C shows the switch of FIG. 1A in a third discrete position for directing items to an left-hand outlet 20;

FIG. 1D is a side elevation view of the switch of FIG. 1A.

FIG. 2A shows in schematic horizontal cross-section a switch according to the invention provided with two vanes, each with two cam rollers, in a first discrete position for directing items to a middle outlet 18;

FIG. 2B shows the switch of FIG. 2A in a second discrete position for directing items to a right-hand outlet 21;

FIG. 2C shows the switch of FIG. 2A in a third discrete postion for directing items to an left-hand outlet 21;

FIG. 2D is a side elevation view of the switch of FIG. 2A shown in horizontal cross-section.

DESCRIPTION OF THE FIGURES AND OF THE EMBODIMENTS

Figure 3:
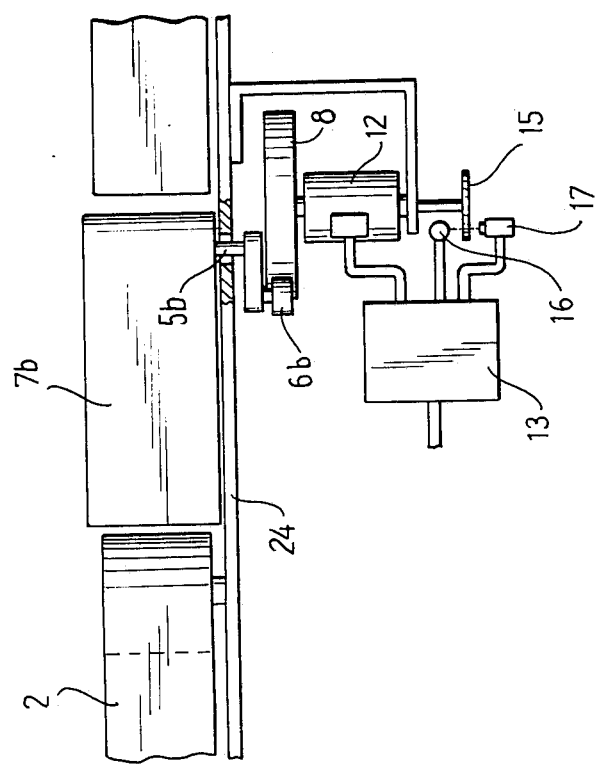
FIG. 3 is a schematic side view of drive motor 12' for the embodiment illustrated in FIGS. 1A-1D, equipped with a control device for accurate positioning.

The embodiment of the invention shown in FIGS. 1A–1D consist of a feeding device 1 for the flow of items to be sorted 4. The switch in the present embodiment consists of two vanes 7 up to 7a inclusive and 7b, which are rotatably mounted round the bearings 5a and 5b. Each of the vanes 7a, 7b is provided with cam followers 6a, 6b, which are rigidly connected to the vanes 7a, 7b, and which are each kept pressed against the cam disc 8 by a spring which is not shown in the figures. This cam disc 8 conforms to the formula mentioned above in the introduction, when q=2, due to which each of the three outlet positions 18, 20 and 24 will be reached twice, if the cam disc 8 turns completely around once. Consequently, $\phi$ equals $\pi$. In other words, each of the three outlet positions 18, 20 and 24 can be reached within an angle of rotation of 180° of the cam disc 8. So each of the outlet situations can be changed into one of the other two outlet situations by turning the cam disc 8 either to the right or to the left over an angle $\alpha$ of $\frac{1}{3} \times 180° = 60°$. The rotational position of the cam disc 8 is adjusted by means of a tachometrically controlled direct-current servomotor 12 which is of course capable of being operated to turn the cam disc 8 either to the left or to the right.

As shown in FIG. 3, the servomotor 12 of FIG. 1D or 2D may be controlled by a circuit in a control device 13 that is a part of the sorting apparatus. The shaft of the motor 12' of FIG. 3 carries the cam disc 8 at one end and at the other end carries a control disc 15 which has recesses or holes around its periphery through which photocell 17 picks up light from a light source 16. The combination of the light source and the photocell is mounted on and electrically connected with the control device 13. Owing to this the control circuit of the device 13 receives information concerning the position of the cam disc 8 and, consequently, about the position of the switch 7, which can be used to continue or stop the motor 12'.

In the position of the cam disc 8 shown in FIG. 1A the vanes 7a, 7b take up such a position that the flow of items 4 ends in the outlet store 18 along the path represented by the arrows 19.

If the cam disc 8 is turned through an angle of 60° to the right by the electromotor 12, the vane 7a will take up a position which is equal to that in FIG. 1A whereas the free end of the vane 7b will take up such a higher position in the figure that the flow of items 4 is deflected via the flank of the vane 7b and will end in the outlet store 21.

If after said turning the cam disc 8 is once again turned to the right over an angle of 60°, the vane 7b will take up a position which corresponds with the position shown in FIG. 1A whereas the vane 7a will take up such a lower position in the figure that the flow of items 4 is deflected via the flank of the vane 7a and will end in the outlet store 20. If after this the cam disc 8 is again turned 60° to the right, the vanes 7a, 7b will take up the rotational positions shown in FIG. 1A as a result of which the flow of items 4 will end in the outlet store 18. If, however, the cam disc 8 is not turned to the right, but 60° to the left, the vanes 7a, 7b will take up again the positions shown in FIG. 1B as a result of which the flow of items 4 will end in the outlet store 21. In this way it will be possible to reach from any position each of the two other positions by turning the cam disc 8 through an angle of 60° either to the right or to the left.

FIG. 1D shows a view of the embodiment as represented in FIG. 1A, notably seen from the bottom. It is remarked that the base plate 24, shown in FIG. 1D, on which the various components mentioned are mounted, has been left out in the FIGS. 1A, 1B and 1C for the sake of clearness.

FIGS. 2A-2D show an improved elaboration of the embodiment of the invention shown in FIGS. 1A-1D. This improvement consists in that each of the vanes 7a, 7b has been provided with a second cam follower 22a, 22b, which follows the cam disc 8 in a position which corresponds with an angular rotation of the cam disc 8 of 90°. This angle of 90° corresponds with the angle α, which is mentioned above and which equals ($\phi$/2), in which case $\phi = \pi$ and, consequently, $\alpha = (\pi/2)$, as already explained in the description of FIGS. 3A ... 3D. Owing to the fact that the vanes 7a, 7b are provided with the second cam followers 22a and 22b it is achieved that these vanes will always take up a fixed rotational position, which cannot be disturbed by e.g. the pressure of the flow of items 4, 19. This involves that the springs mentioned in the description of FIGS. 3A ... 3D, but not shown, and serving to keep the cam followers 6a and 6b pressed against the cam disc 8, can be dispensed with. It is remarked that the second cam followers 22a and 22b could be mounted on the vanes 7a and 7b in a somewhat springy way, in order to get rid of any back lash. For the rest the FIGS. 2A up to 2D inclusive fully correspond with the FIGS. 1A up to 1D inclusive.

It is remarked that apart from the use for driving the switch vanes 7 (a, b), the driving part of the present invention can very well be utilized for driving other quickly intermittently moving parts in for example knitting machines or other textile machines or in electronic typewriters or computer printers.

We claim:

1. Switch for a sorting device for items, which items flow in a flow direction from one inlet towards three outlets of said sorting device switch, comprising two vanes for guiding said items towards one of said outlets, which vanes are pivoted independently with respect to each other and are pivotable by driving means causing movement of each of said vanes in a direction transverse to said flow direction, characterized in that said driving means comprise a first cam disc (8) being rotatable by rotation means (12) and two first cam followers (6a, b) being firmly connected each with a respective one of said vanes (7a, b) and being in contact with said first cam disc.

2. Switch in accordance with claim 1, characterized in that said vanes (7a, b) respectively have second cam followers (22a, b) and said first cam followers (6a, b) as well as said second cam followers (22a, b) are in contact one and the same, common cam disc (8) which is rotatable by said rotation means (12).

3. Switch in accordance with claim 1, characterized in that the cam disc rotates between at least two rotational positions which are at equal relative rotational angles to each other and the shape of the cam disc (8) is such that each of the vanes (7a, 7b) will always have one of two discrete vane positions for guiding the items to one of said three outlets (18, 20, 21).

4. Switch in accordance with claim 3, characterized in that the cam disc (8) has a radius, extending to a point of contact with a said first cam follower (6a, b), which varies as a function of its rotation angle in a manner corresponding with the mathematical representation $r(f) = A + B \cos(qf) + C \cos(3qf) + D \cos(5qf) + \ldots + N \cos(nqf)$, in which r(f) is said radius, A is a constant corresponding with the average value of r(f), B is a constant representing the amplitude of the variation of said radius r(f), and C, D and N represent the degree of influence of the respective higher odd harmonics, of said variation, in which case B, C, D and N are positive or negative, q is a positive, whole number, equal to $(2\pi/\Phi)$, in which $\Phi$ is the angle of rotation of the cam disc (8) by said rotation means whereby said items can, by rotation through said angle, reach each of said outlets (18, 20, 21) by means of different successive combinations of said discrete vane positions produced by rotation of said cam disc, and f is the variable angular rotation angle of the cam disc (8), at least two of said higher harmonics being included in said mathematical representation.

5. Switch in accordance with claim 4, characterized in that each of the vanes (7a, 7b) has a second cam follower (22a, 22b), said first cam follower (6a, 6b) of each vane being in contact with said cam disc (8) at a first contacting point and said second cam follower (22a, 22b) of each vane being in contact with said cam disc at a second contacting point, straight lines respectively between said first contacting point and said rotation axis and between said second contacting point and said rotation axis intersecting with an angle which is equal to ($\Phi$/2), in which $\Phi$ is said rotation angle of the cam disc (8).

6. Switch in accordance with claim 5, characterized in that q has a value which is in the range of from 1 up to 4, inclusive, q being the whole number defined as such for said mathematical representation.

7. Switch in accordance with claim 1, characterized in that the cam disc (8) is driven by a tachometrically controlled direct-current servomotor (12) comprising a shaft, the position of said shaft being controlled from a control device (13), which forms part of the sorting device.

8. Switch in accordance with claim 7, characterized in that the transmission ratio between the drive motor (12) and each of the vanes (7a, 7b) driven via the cam disc (8) has such a value that the external mass moment of inertia is about equal to the internal mass moment of inertia of the drive motor (12).

9. Switch in accordance with claim 1, characterized in that each of the vanes (7a, 7b) is rotatable around a shaft 5a, 5b, which is in a position transverse to said flow direction (4, 19).

10. Switch in accordance with claim 1, characterized in that each of the vanes (7a, b) is angularly movable about an axis (5a, 5b) transverse to said flow direction (4, 19).

* * * * *

UNITED STATES PATENT AND TRADEMARK OFFICE
CERTIFICATE OF CORRECTION

PATENT NO. : 4,785,942

DATED : November 22, 1988

INVENTOR(S) : Harro M. VAN LEIJENHORST et al

It is certified that error appears in the above-identified patent and that said Letters Patent is hereby corrected as shown below:

Title page, right-hand column, under the heading "FOREIGN PATENT DOCUMENTS" change the fifth document (U.S.S.R.) "270508" to -- 210508--.

Signed and Sealed this

Twenty-first Day of November, 1989

Attest:

JEFFREY M. SAMUELS

*Attesting Officer*  *Acting Commissioner of Patents and Trademarks*